(12) United States Patent
Ono (10) Patent No.: US 7,319,790 B2
(45) Date of Patent: Jan. 15, 2008

(54) IMAGE COMPARING APPARATUS, IMAGE COMPARING METHOD, COMPUTER READABLE MEDIUM RECORDING PROGRAM FOR IMAGE COMPARISON, PHOTOGRAPHING APPARATUS, AND PHOTOGRAPHING METHOD

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 615 days.

(21) Appl. No.: 10/178,567

(22) Filed: Jun. 25, 2002

(65) Prior Publication Data
US 2003/0007688 A1 Jan. 9, 2003

(30) Foreign Application Priority Data
Jul. 5, 2001 (JP) ............................ 2001-205035

(51) Int. Cl.
G06K 9/64 (2006.01)
G06K 9/68 (2006.01)
(52) U.S. Cl. ...................................... 382/217
(58) Field of Classification Search ................ 382/289, 382/274, 165, 255, 217; 345/1
See application file for complete search history.

(56) References Cited

U.S. PATENT DOCUMENTS

| | | | | |
|---|---|---|---|---|
| 5,081,529 A | * | 1/1992 | Collette | 358/504 |
| 5,369,430 A | * | 11/1994 | Kitamura | 348/94 |
| 5,905,503 A | * | 5/1999 | Penna | 345/426 |
| 5,930,783 A | * | 7/1999 | Li et al. | 707/1 |
| 6,157,734 A | * | 12/2000 | Iida | 382/162 |
| 6,181,818 B1 | * | 1/2001 | Sato et al. | 382/170 |
| 6,512,850 B2 | * | 1/2003 | Yaung | 382/225 |
| 6,563,959 B1 | * | 5/2003 | Troyanker | 382/282 |
| 6,567,543 B1 | * | 5/2003 | Shiraiwa et al. | 382/167 |
| 6,636,635 B2 | * | 10/2003 | Matsugu | 382/218 |
| 6,654,491 B1 | * | 11/2003 | Hidaka | 382/162 |
| 6,798,905 B1 | * | 9/2004 | Sugiura et al. | 382/168 |
| 6,831,659 B1 | * | 12/2004 | Mukoyama et al. | 345/619 |

* cited by examiner

Primary Examiner—Bhavesh M Mehta
Assistant Examiner—Jonathan Schaffer
(74) Attorney, Agent, or Firm—Sughrue Mion, PLLC (57) ABSTRACT

An image comparing apparatus for comparing a particular inspect image with a search image containing a subject shown on the inspect image, including a search-image supplying unit storing therein a plurality of search images, an image acquisition unit acquiring information characterizing the subject image, the image acquisition unit selectively extracting at least one search image from the search image supplying unit according to the acquired information, and an image specifying unit specifying a particular search image by comparing the inspect image with each of the search-images extracted by the image acquisition unit.

23 Claims, 7 Drawing Sheets

FIG. 1

| | ILLUMINATION DIRECTION | | | |
|---|---|---|---|---|
| | | DIRECTION OF LEFT SIDE | DIRECTION OF FRONT | DIRECTION OF RIGHT SIDE |
| ORIENTATION OF SEARCH OBJECTIVE | LEFT SIDE | (G1) FACE a11 FACE b11 | (G2) FACE a12 FACE b12 | (G3) FACE a13 FACE b13 |
| | FRONT | (G4) FACE a21 FACE b21 | (G5) FACE a22 FACE b22 | (G6) FACE a23 FACE b23 |
| | RIGHT SIDE | (G7) FACE a31 FACE b31 | (G8) FACE a32 FACE b32 | (G9) FACE a33 FACE b33 |

IMAGE COMPARING APPARATUS, IMAGE COMPARING METHOD, COMPUTER READABLE MEDIUM RECORDING PROGRAM FOR IMAGE COMPARISON, PHOTOGRAPHING APPARATUS, AND PHOTOGRAPHING METHOD

CROSS REFERENCE TO RELATED APPLICATIONS

This patent application claims priority from Japanese patent application No. 2001-205035 filed on Jul. 5, 2001, the contents of which are incorporated herein by reference.

BACKGROUND OF THE INVENTION

1. Field of the Invention

The present invention relates to an image comparing apparatus, an image comparing method, a computer readable medium recording a program for image comparison, a photographing apparatus, and a photographing method. More particularly, the present invention relates to an image comparing apparatus, an image comparing method, a computer readable medium recording a program for image comparison, a photographing apparatus, and a photographing method for comparing a particular inspect image having a subject image with a plurality of search images.

2. Description of the Related Art

Conventionally, a method of comparing search images obtained by photographing a subject with an inspect image has been proposed for identifying a subject of the inspect image. According to such a conventional method, if the subject of the inspect image and the search images are captured under the same conditions or environments, the conventional method could produce a good result.

However, in a case where the same subject is photographed but an orientation of the subject or an illumination direction to the subject at a time of capturing the subject image is different between the inspect image and the search images, those images appear different. Thereby, under the consideration, it may be difficult to determine that the subject of the inspect image is the same as that of the search image.

One of the methods for providing a better result than the aforementioned conventional one is, for example, a method in which a plurality of search images is prepared beforehand upon which the subject is photographed under various conditions. Then, each of the search images is compared with the inspect image. However, this method would require cost and time to provide a reasonable result for checking the inspect image. On the other hand, in a case where there are a plurality of subjects to be identified, the inspect image would be falsely identified as similar to the search image regardless that completely different subjects are photographed depending on the orientation of the subject or illumination condition at the time of photographing. Thereby, erroneous judgment could sometimes occur such that the plurality of the subjects is identified as the same subject.

SUMMARY OF THE INVENTION

It is an object of the present invention to provide an image comparing apparatus, an image comparing method, a computer readable medium recording a program for image comparison, a photographing apparatus, and a photographing method.

According to an embodiment of the present invention, an image comparing apparatus for comparing an inspect image having a subject image with a search image on which the search objective appears, includes: a search image supplying unit for supplying a plurality of search images for checking the subject image; an image obtaining unit for obtaining information characterizing the subject image at a time of capturing the subject image which appears on the inspect image, and for selectively obtaining at least one search image corresponding to information characterizing the subject image from the search image supplying unit; and an image specifying unit for specifying the search image matching with the inspect image by comparing each of the at least one search image obtained by the image obtaining unit with the inspect image.

In an aspect of this embodiment of the present invention, the image obtaining unit may obtain the information characterizing the subject image from appending information appending to the inspect image obtained at a time of capturing the subject image. The image obtaining unit may obtain the illumination condition of the subject at the time of capturing, as information characterizing the subject image, and obtains the search image illuminated under the substantially same condition as the illumination condition from the search image supplying unit. The image obtaining unit obtains an illumination direction to which the subject is illuminated at the time of photographing as the illumination condition, and obtains the search image illuminated from substantially the same direction as the illumination direction from the search image supplying unit. The image obtaining unit obtains an orientation of the subject to which the subject is directed as information of the subject state, and may obtain the search image directed to substantially the same direction as the subject orientation from the search image supplying unit.

According to an aspect of the present invention, the image comparing apparatus, further includes: a color temperature obtaining unit for obtaining color temperature of an illumination source illuminating the subject at the time of capturing the subject image; and a color adjusting unit for adjusting hue of the search image to be illuminated by the illumination source having the substantially same color temperature as color temperature obtained by the color temperature obtaining unit.

In an aspect of the present invention, the search image supplying unit categorizes the plurality of search images into a plurality of image groups based on a state at the time of capturing the search objective and stores the categorized search images; and the image obtaining unit selects one of the plurality of image groups based on information characterizing the subject image, and obtains the search image from the selected image group. The image comparing apparatus, further includes: a focus-state obtaining unit in for obtaining a state of achievement of focus in the inspect image; and a focus-state adjusting unit in for adjusting a state of achievement of focus in the search image obtained by the image obtaining unit based on the state of achievement of focus in the inspect image, in which the image specifying unit compares the search image after the state of achievement of focus is adjusted with the inspect image. The search image supplying unit forms the search image in the same state as the subject image based on information characterizing a subject image, obtained by the image obtaining unit in computer simulation to supply the search image to the image obtaining unit.

According to another aspect of the present invention, an image comparing method of comparing an inspect image having a particular subject image with a search image, includes steps of: obtaining information of a subject image appearing on the inspect image at a time of capturing the subject image, and selectively obtaining at least one search image corresponding to the obtained information of the subject image from the search image supplying unit; and specifying the search image to match with the inspect images by comparing each of at least one search image with the inspect image.

According to another aspect of the present invention, a computer readable medium recording a program for image comparison for making a computer realize a function for comparing an inspect image having a subject image with a search image, in which the computer readable medium recording the program makes the computer realize functions for: obtaining information characterizing a subject image appearing on the inspect image at a time of capturing the subject and selectively obtaining at least one search image corresponding to the obtained information characterizing the subject image from the search image supplying unit; and specifying the search image to match with the inspect image by comparing each of at least one search image with the inspect image.

According to still another aspect of the present invention, a photographing apparatus, includes: a photographing unit for photographing a subject to output a subject image; a detecting unit of an illumination direction for detecting the illumination direction to which the subject is illuminated at a time of photographing; and a recording unit for recording the subject image and the illumination direction corresponding the subject image to a recording medium.

According to another aspect of the present invention, a photographing method, includes steps of: photographing a subject to output a subject image; detecting an illumination direction to which the subject is illuminated at a time of photographing; and storing the subject image and the illumination direction corresponding the subject image to the illumination direction.

This summary of the present invention does not necessarily describe all necessary features so that the invention may also be a sub-combination of these described features.

DETAILED DESCRIPTION OF THE EMBODIMENT

The invention will now be described based on preferred embodiments, which do not intend to limit the scope of the present invention, but rather to exemplify the invention. All of the features and the combinations thereof described in the embodiments are not necessarily essential to the invention.

Figure 1:
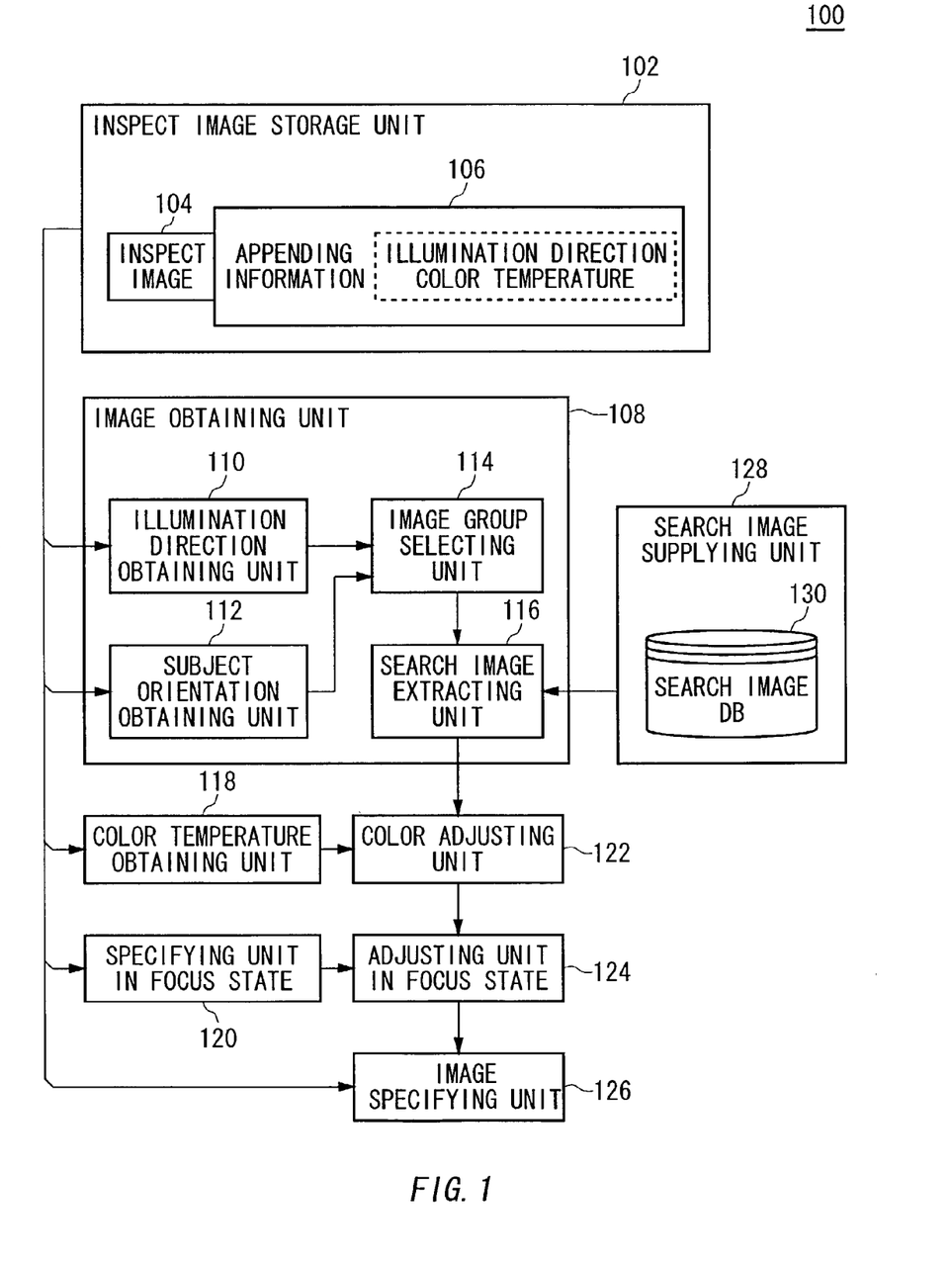
FIG. 1 shows a functional block diagram in image comparing apparatus 100 according to an embodiment of the present invention.

FIG. 1 shows a functional block diagram in image comparing apparatus 100 according to an embodiment in the present invention. The image comparing apparatus 100 compares the inspect image having a subject image with the search image on which a predetermined search objective appears. Then, the image comparing apparatus 100 specifies the search image to match with the inspect images.

Image comparing apparatus 100 includes inspect image storage unit 102, search image supplying unit 128, and image obtaining unit 108.

Inspect image storage unit 102 stores inspect image 104 having a subject image and appending information 106 appending to the inspect image. Inspect image 104 may be an image where, for example, a picture printed on a printing paper is captured by a scanner. Further, inspect image 104 may be an image photographed by a digital camera or an image provided by any web server through the Internet. Appending information 106 is information characterizing the subject image at a time of capturing the subject image appearing on inspect image 104. In the present embodiment, appending information 106 is an illumination direction showing a state where the subject is illuminated, and color temperature of an illuminative source to illuminate the subject.

Search image supplying unit 128 supplies the search image to be searched with respect to the inspect image into image obtaining unit 108. For example, the search image includes a face of a specific person. In the present embodiment, search image supplying unit 128 includes search image DB 130 for categorizing a plurality of search images into a plurality of image groups and storing the categorized image groups.

Image obtaining unit 108 obtains information characterizing a subject image appearing on inspect image 104 at a time of capturing the subject image. According to the obtained information, image obtaining unit 108 selectively extracts at least one search image from the search image supplying unit. Further, image obtaining unit 108 includes illumination direction obtaining unit 110 and subject orientation obtaining unit 112. Illumination direction obtaining unit 110 obtains an illumination direction from appending information 106 stored in inspect image storage unit 102. Subject orientation obtaining unit 112 obtains inspect image 104 and specifies the orientation of a particular subject image such as the face of the person, which appears on inspect image 104. Subject orientation obtaining unit 112 specifies a region in a flesh color and a region including a point of hue corresponding to eyes of the person as the face of the person. Subject orientation obtaining unit 112 determines if the face directs to a front or to any of left and right directions based on a reference such that two points which are eyes in that region are located at positions where left and right are almost symmetrical or only one point is at either the left side or the right side.

Image obtaining unit 108 further includes image group selecting unit 114 and search image extracting unit 116. Image group selecting unit 114 receives information characterizing a subject image, such as the illumination direction and the subject orientation from illumination direction obtaining unit 110 and subject orientation obtaining unit 112. Image group selecting unit 114 selects a particular one out of the image groups stored in search image supplying unit 128 based on the received information characterizing the subject image. Following to selecting the image group in the image group selecting unit 114, search image extracting unit 116 extracts a search image from the selected image group.

Image comparing apparatus 100 further includes color temperature obtaining unit 118, color adjusting unit 122, focus state specifying unit 120, focus state adjusting unit 124, and image specifying unit 126 other than functional units as described above.

Color temperature obtaining unit 118 obtains color temperature of the illumination source illuminating the subject of inspect image 104 from appending information 106 stored in inspect image storage unit 102.

Color adjusting unit 122 adjusts hue of search image extracted by search image extracting unit 116 so as to be an image to be illuminated by the illumination source having the substantially same temperature as the color temperature obtained by color temperature obtaining unit 118.

Focus state specifying unit 120 obtains inspect image 104 from inspect image storage unit 102 and analyzes, for example, spatial frequency of inspect image 104. Thereby, focus state specifying unit 120 specifies a state of achievement of focus in inspect image 104.

Focus state adjusting unit 124 adjusts the state of achievement of focus in the search image extracted by search image extracting unit 116 so as to be the substantially same state of achievement of focus as the state of achievement of focus specified by focus state specifying unit 120.

Image specifying unit 126 compares inspect image 104 with search image whose state of achievement of focus is adjusted by focus state adjusting unit 124. Image specifying unit 126 judges whether or not the search objective appears on the inspect image. Thereby, image specifying unit 126 specifies the search image on which the subject is the same as one on inspect image 104.

Figure 2:
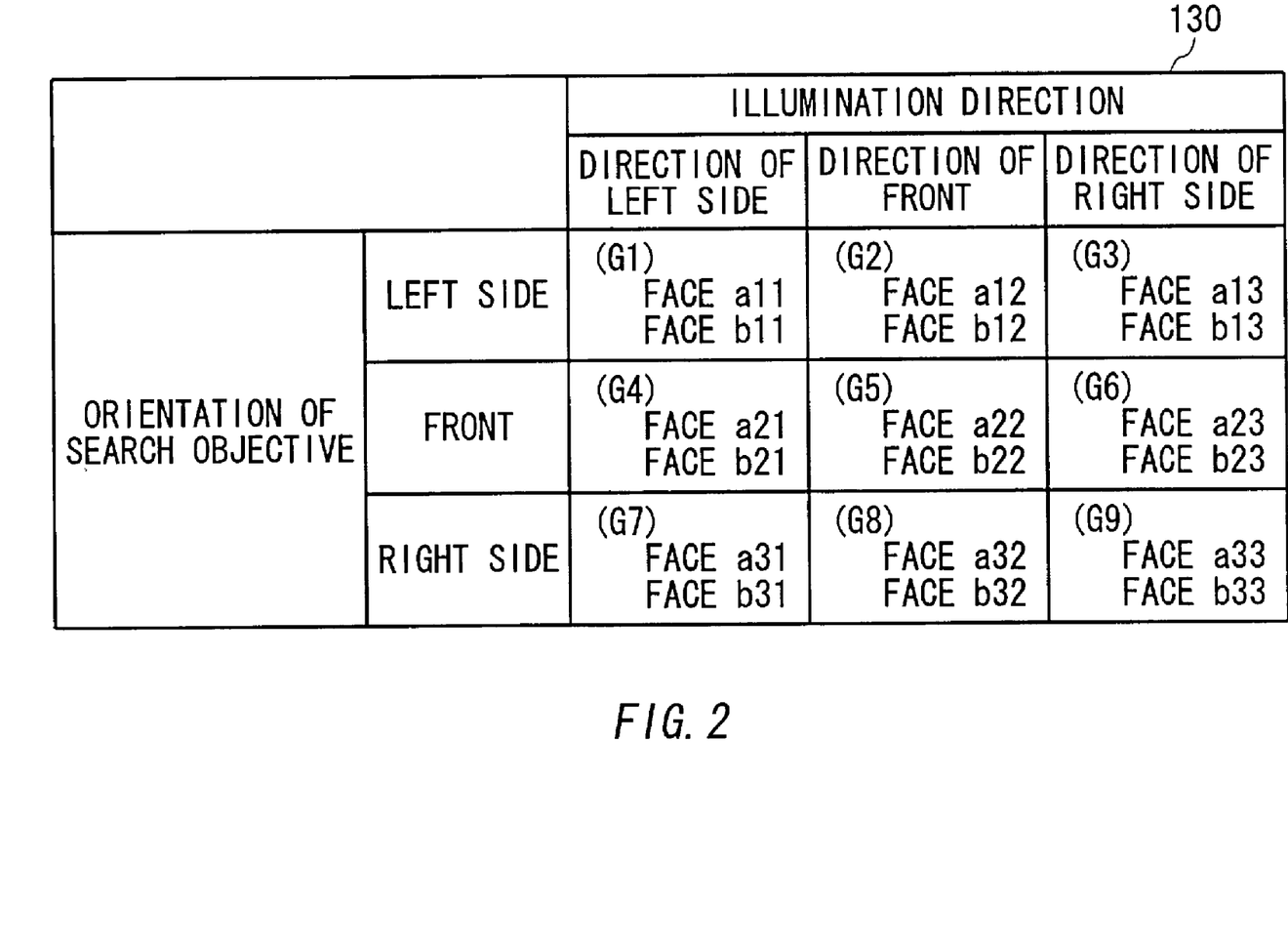
FIG. 2 shows one example of information stored in the search image DB in accordance with another embodiment of the present invention.

FIG. 2 shows one example of information stored in search image DB 130 in accordance with another embodiment of the present invention. In the shown example, search image DB 130 stores a plurality of search images representing face a11 to face a33, and a plurality of search images representing face b11 to face b33, on which faces b appear differently from the faces a. Search image DB 130 categorizes the plurality of search images into the plurality of image groups based on the state of capturing the search objective and store the categorized search images. In the present embodiment, search image DB 130 categorizes the search image into nine different image groups depending on factors where luminary illuminates the search objective from either the left side, the front, or the right side direction in the image, or the search objective which appears on the search image directs to either the left side, the front, or the right side in the image. Search image DB130 stores the categorized image groups.

Image group selecting unit 114 as aforementioned selects the image groups categorized into the substantially same illumination direction as the illumination direction obtained by illumination direction obtaining unit 110 and the substantially same search objective orientation as the orientation of the subject obtained by subject orientation obtaining unit 112. Image group selecting unit 114 selects the image groups from the image groups stored in search image DB 130. In this case, the substantially same illumination direction means that two illumination directions are identical within a predetermined margin of error. Similarly, the substantially same orientation means that two orientations are identical within a predetermined margin of error.

Search image extracting unit 116 extracts a search image from the image groups selected by image group selecting unit 114. For example, in a case where image group selecting unit 114 selects an image group G1, search image extracting unit 116 extracts the search image of the face a11 and the face b11 in the image group G1.

Figure 3:
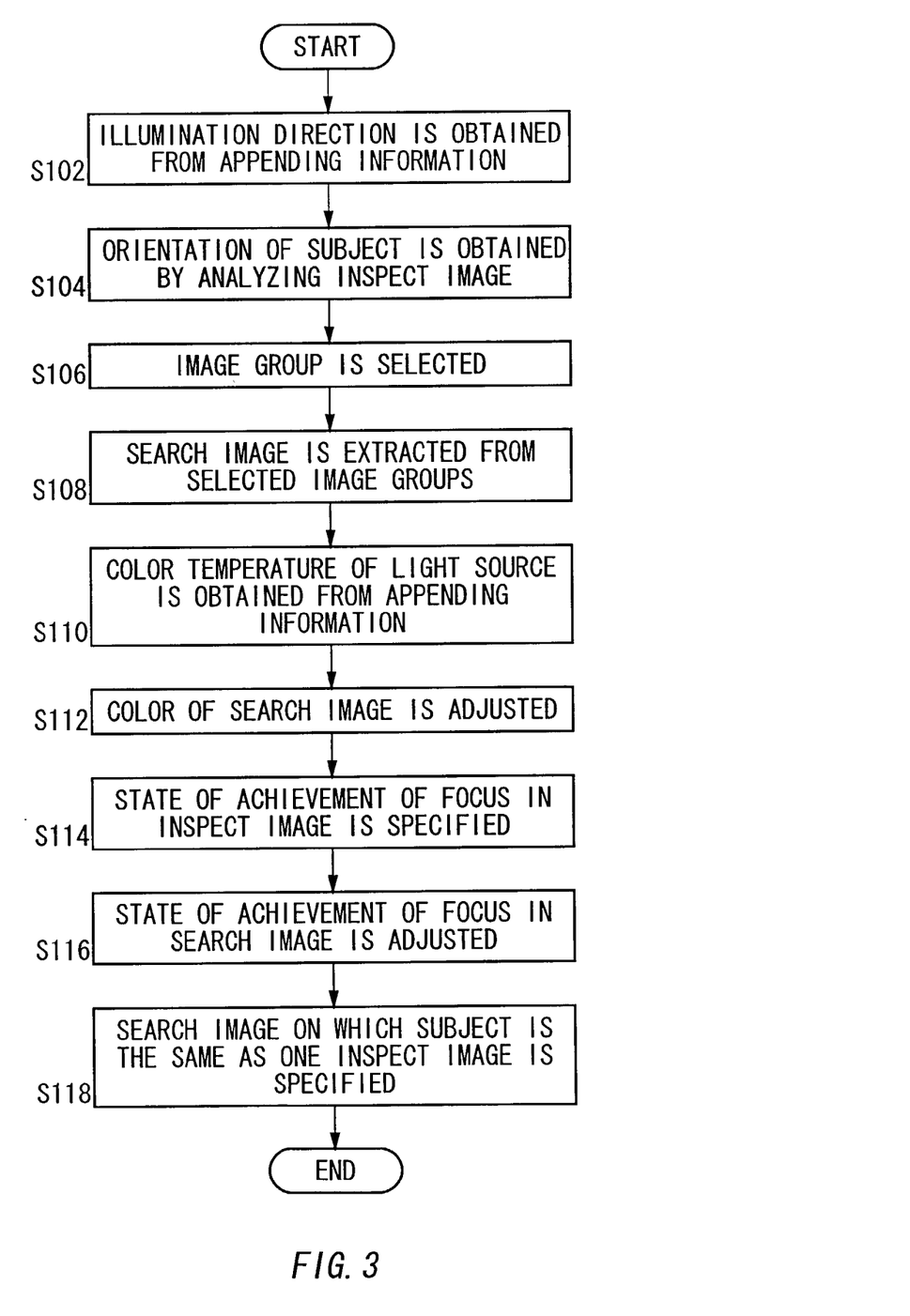
FIG. 3 shows a flowchart showing a process in image comparing apparatus 100 in accordance with the other embodiment of the present invention.

FIG. 3 shows a flowchart showing a process in image comparing apparatus 100 in accordance with other embodiment of the present invention. In image comparing apparatus 100, at first, illumination direction obtaining unit 110 obtains the illumination direction of the subject image appearing on inspect image 104 from appending information 106 stored in inspect image storage unit 102 (S102). Next, subject orientation obtaining unit 112 obtains inspect image 104 from inspect image storage unit 102 and further obtains the orientation of the subject image which appears on inspect image 104 by analyzing obtained inspect image 104 (S104).

Image group selecting unit 114 selects at least one among the plurality of image groups stored in search image DB 130 based on the illumination direction obtained by illumination direction obtaining unit 110 and the subject orientation obtained by subject orientation obtaining unit 112 (S106). Search image extracting unit 116 extracts the search image from the image groups selected at S106 from search image DB 130 (S108).

Color temperature obtaining unit 118 obtains color temperature of the illumination source illuminating the subject of inspect image 104 from appending information 106 stored in inspect image storage unit 102, and inputs the obtained color temperature into color adjusting unit 122 (S110). Color adjusting unit 122 adjusts hue of the search image extracted by search image extracting unit 116 based on input color temperature (S112).

Focus state specifying unit 120 obtains inspect image 104 from inspect image storage unit 102 and specifies the state of achievement of focus in inspect image 104 (S114). Focus state adjusting unit 124 adjusts the state of achievement of focus in the search image after color adjusting unit 122 adjusts color based on the state of achievement of focus specified by focus state specifying unit 120 (S116).

Image specifying unit 126 compares the search image after focus state adjusting unit 124 adjusts the state of achievement of focus with inspect image 104. This comparison is conducted for all of the search images extracted by search image extracting unit 116 in S108. Image specifying unit 126 specifies the search image having the search objective, which matches with the subject, which appears on inspect image 104 by the above comparison (S118).

As described above in this embodiment of the present invention, image comparing apparatus 100 selectively extracts the search image on which the search objective appears in the same state as the subject of inspect image 104 from the plurality of search images stored in search image DB 130. Indeed, image comparing apparatus 100 selectively extracts the search image having the substantially same appearance as the subject of inspect image 104, and compares the extracted search image with inspect image 104. Thus, the number of the search images which will be compared with inspect image 104 is reduced prior to the companion. Therefore, image comparing apparatus 100 can greatly reduce time for the comparison. In another advantageous feature of the embodiment of the present invention, image comparing apparatus 100 provides more accurate and efficient image comparison, so that it can properly recognize the difference between inspect image 104 and a search image even if these images accidentally appear similar to each other, for example, when the subject of inspect image 104 faces to a different direction from a search object in the search image, or when the subject of inspect image 104 is illuminated in a different direction from a search object in the search image.

Figure 4:
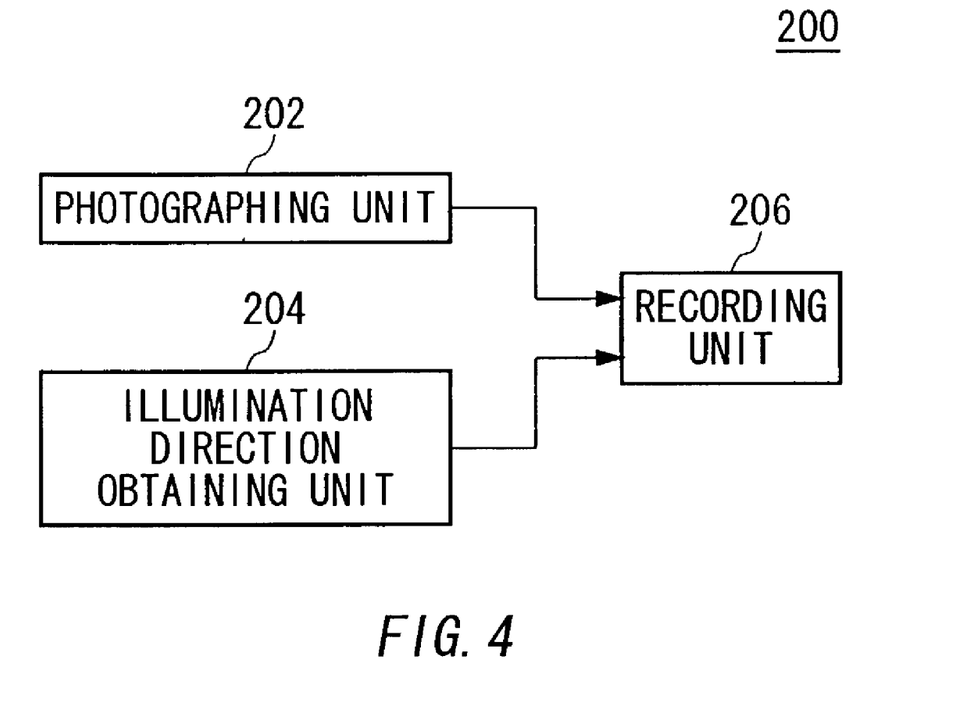
FIG. 4 shows a functional block diagram of photographing apparatus 200 to photograph inspect image 104 in accordance with the other embodiment of the present invention.

FIG. 4 shows a functional block diagram of photographing apparatus 200 to capture inspect image 104 in accordance with an embodiment of the present invention.

Photographing apparatus 200 is, for example, a digital camera and includes photographing unit 202, illumination direction obtaining unit 204, and recording unit 206. Photographing unit 202 forms inspect image 104 by capturing the subject image and specifies color temperature of the illumination source illuminating the subject of the captured subject image. Illumination direction obtaining unit 204 detects the direction to which the subject photographed by photographing unit 202 is illuminated at the time of capturing the subject image. Obtaining unit 204 of illumination direction obtaining unit 204 may be an input device, which a photographer can manually use to input the illumination direction. Illumination direction obtaining unit 204 may be a device to determine the illumination direction to the subject based on a position of the illumination source to illuminate the subject specified through a fisheye lens provided on a top face of photographing apparatus 200 and a photograph direction of photographing unit 202 (optical axis direction of a photographing optical system). Recording unit 206 records inspect image 104 formed by photographing unit 202 to, for example, a semiconductor memory detachable from photographing apparatus 200. Recording unit 206 records color temperature specified by photographing unit 202, and the illumination direction obtained by obtaining unit 204 of the illumination direction obtaining unit 204 as appending information 106 characterizing a subject image of inspect image 104. By using photographing apparatus 200, illumination direction of the subject at the time of capture is easily recorded corresponding to inspect image 104.

Figure 5:
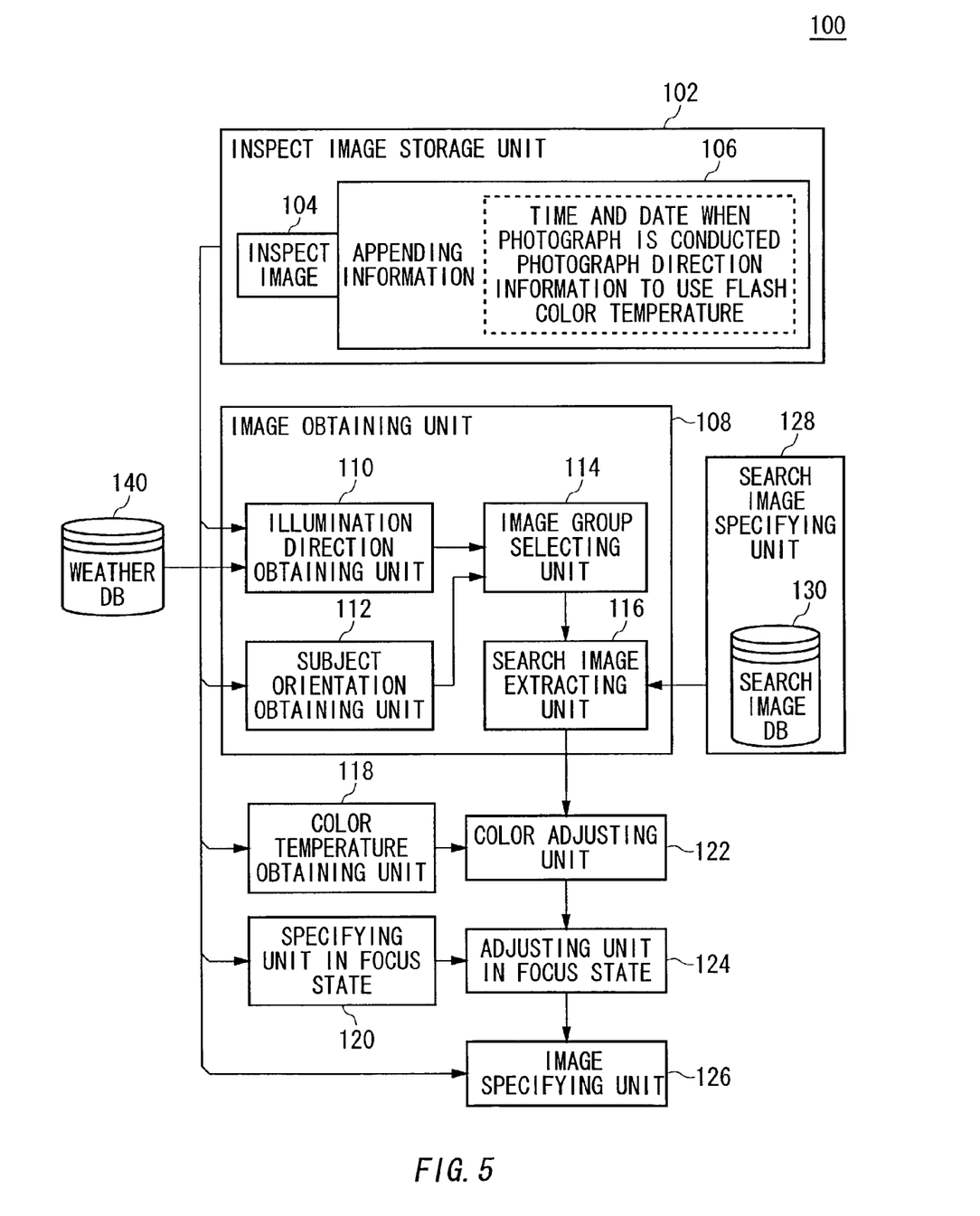
FIG. 5 shows a functional block diagram in image comparing apparatus 100 according to other embodiment of the present invention.

FIG. 5 shows a functional block diagram in image comparing apparatus 100 according to other embodiment of the present invention. Although this embodiment of the present invention will be described below, the same reference is applied for the same function unit as a function unit described in the previous embodiment, and detailed description will be omitted.

In this embodiment, image comparing apparatus 100 is different from image comparing apparatus 100 in the previous embodiment by features that temperature DB 140 is further provided, appending information 106 stored in inspect image storage unit 102 is different from appending information 106 in FIG. 1, and a process in illumination direction obtaining unit 110 is different from that in illumination direction obtaining unit 110 in FIG. 1. In the other features, image comparing apparatus 100 of this embodiment is similar to image comparing apparatus 100 of the previous embodiment.

In this embodiment, appending information 106 includes time and date when inspect image 104 corresponding to appending information 106 is captured, a photograph direction, information to use flash, and color temperature. The photograph direction is a direction where the subject is located based on the photographing apparatus when inspect image 104 is captured. The information to use flash is information whether or not a flash is used at the time of capturing inspect image 104. The color temperature is color temperature of the illumination source to illuminate the subject of inspect image 104 at the time of capture.

Temperature DB 140 stores information referring to past weather corresponding to the date, for example, weather on Mar. 14, 2001 is clear, a sunrise is 5:52, and a sunset is 17:48.

Illumination direction obtaining unit 110 determines illumination direction to the subject of inspect image 104 based on information stored in appending information 106 and temperature DB 140. For example, in a case where time and date when inspect image 104 is captured are 13:00 on Mar. 14, 2001, the photograph direction is North, and flash is not used referring to appending information 106, and the subject image is captured when an apparatus, which captures the subject images, has the sun to its back on a clear day. Thereby, illumination direction obtaining unit 110 determines that the subject is illuminated from the front. As for another example, in a case where time and date when inspect image 104 is captured are 21:00 on Mar. 14, 2001 and flash is used referring to appending information 106, inspect image 104 is captured with the flash on after sunset takes places. Thereby illumination direction obtaining unit 110 determines that the subject of inspect image 104 is illuminated from the front. Illumination direction obtaining unit 110 inputs the obtained illumination direction, as described above, into image group selecting unit 114. Image group selecting unit 114 selects the image group based on the illumination direction input similar to the description as aforementioned in the previous embodiment.

Figure 6:
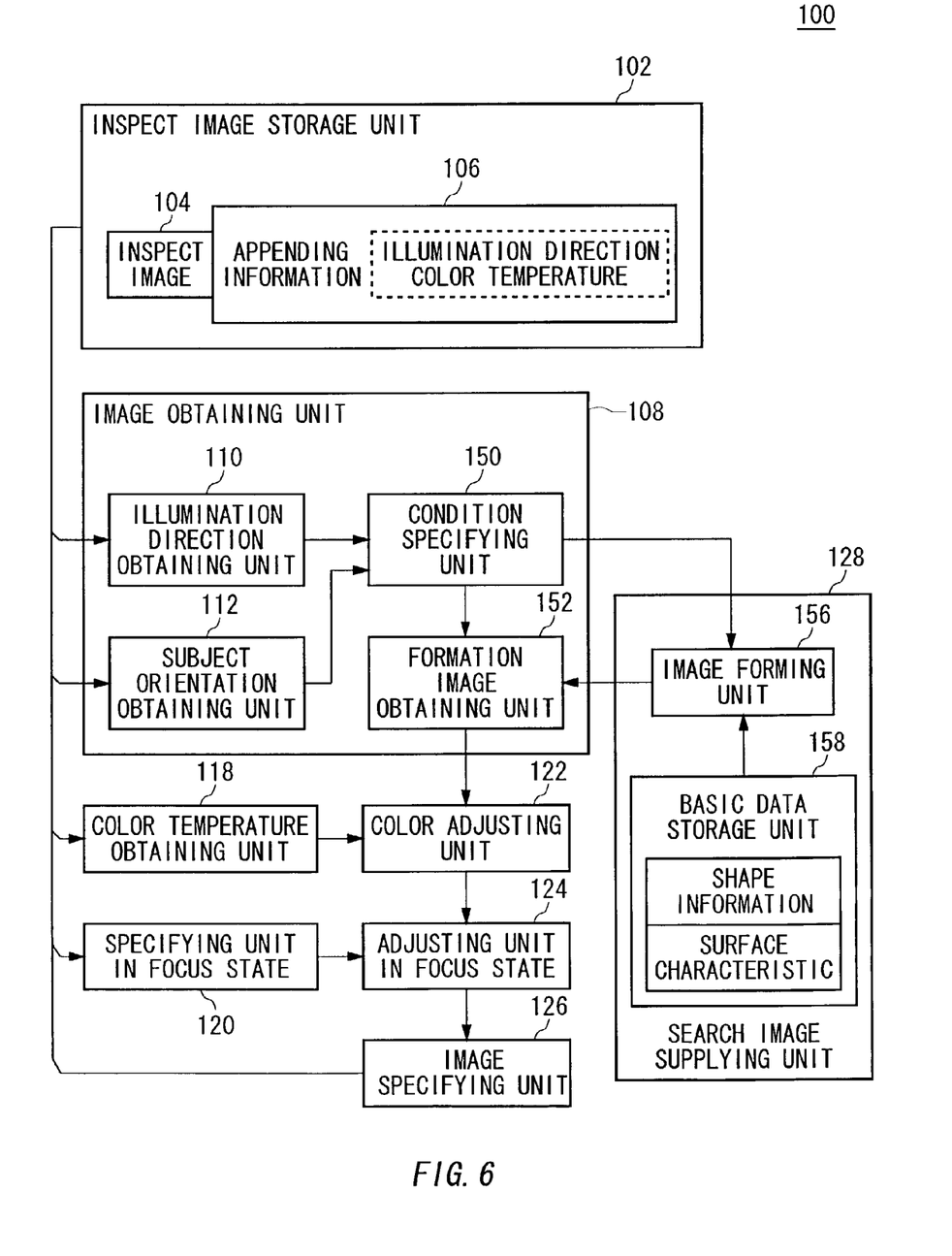
FIG. 6 shows a functional block diagram in image comparing apparatus 100 according to other embodiment of the present invention.

FIG. 6 shows a functional block diagram in image comparing apparatus 100 according to other embodiment of the present invention. Although this embodiment of the present invention will be described below, the same reference is applied for the same function unit as a function unit described in the first embodiment, and detailed description will be omitted.

In image comparing apparatus 100 of the present embodiment, image obtaining unit 108 and search image supplying unit 128 are different from ones in image comparing apparatus 100 of the first embodiment. Image obtaining unit 108 of the present embodiment is different from image obtaining unit 108 of the first embodiment by features that condition specifying unit 150 and formation image obtaining unit 152 are included instead of image group selecting unit 114 and search image extracting unit 116. Search image supplying unit 128 of the present embodiment is different from search image supplying unit 128 of the first embodiment by features that basic data storage unit 158 and image forming unit 156 are included instead of search image DB 130. In the other features, image comparing apparatus 100 of the present embodiment is the same as image comparing apparatus 100 of the first embodiment.

Image forming unit 156 included in search image supplying unit 128 forms a search image by computer simulation. Basic data storage unit 158 stores necessary basic data to form the search image by image forming unit 156. The basic data includes shape information of the search objective including, e.g., a movable constitution, and information as to a surface characteristic such as surface color or gloss.

Condition specifying unit 150 included in image obtaining unit 108 specifies the condition of the search image to be formed in image generating unit 156. In the present embodiment, condition specifying unit 150 specifies the condition to form the search image illuminated from the substantially same direction as the illumination direction obtained illumination direction obtaining unit 110 and directed to the substantially same orientation as the subject orientation obtained by subject orientation obtaining unit 112. According to the condition specified in condition specifying unit 150, formation image obtaining unit 152 obtains the image formed by image forming unit 156, and outputs the obtained image into color adjusting unit 122.

In this embodiment, image comparing apparatus 100 forms a search image based on shape information. Thus, it is not necessary to prepare beforehand the plurality of search images such as image comparing apparatus 100 of the firstly explained embodiment. This embodiment improves the firstly explained embodiment in a case where the search image corresponding to the orientation of the subject or the illumination direction in inspect image 104 is not prepared in search image DB 130 beforehand, image comparing apparatus 100 can achieve comparing inspect image 104 with the search image properly.

Figure 7:
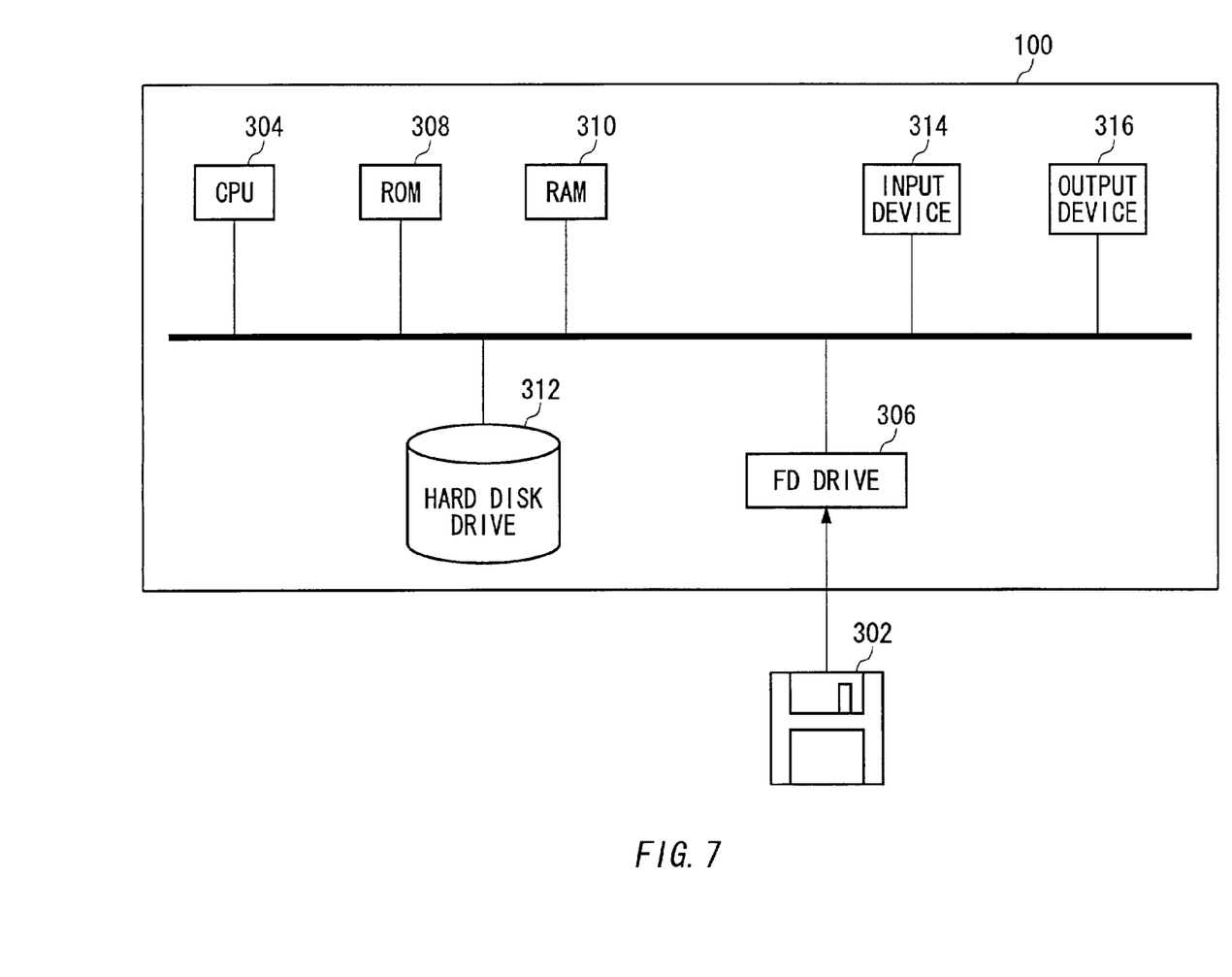
FIG. 7 shows a block diagram showing one example of hardware components of image comparing apparatus 100 according to other embodiment of the present invention.

FIG. 7 shows a block diagram showing one example of hardware components of image comparing apparatus 100 according to other embodiment of the present invention. Image comparing apparatus 100 includes CPU 304, ROM 308, and RAM 310. ROM 308 and RAM 310 store a program executed by CPU 304. Image comparing apparatus 100 includes input device 314 such as a keyboard which can input various instructions by a user, and output device 316 which can display, for example, a result of comparison of image. Image comparing apparatus 100 includes hard disk drive 312 for storing an image or the program, and FD drive 306. FD disk drive 306 reads from and writes data to FD disk 302.

CPU 304 performs functions of each function unit described in FIGS. 1, 5, or 6 by executing the program stored in ROM 308 or RAM 310. The program executed by CPU 304 may be stored beforehand in ROM 308 or hard disk drive 312, or may be supplied by FD 302. FD 302 is one example of a recording medium for recording the computer readable program. The program executed by CPU 304 may be provided by an optical recording medium such as CD-ROM or DVD, a magnetic recording medium of an MD, or a semiconductor memory such as an IC card instead of FD 302.

As is obvious from the above, according to embodiments of the present invention, it is possible to provide an image comparing apparatus, an image comparing method, a computer readable medium recording a program for image comparison, a photographing apparatus, and a photographing method which immediately and accurately specify a search image on which the same subject as an inspect image appears.

Although the present invention has been described by way of exemplary embodiments, it should be understood that many changes and substitutions may be added or modified by those skilled in the art without departing from the spirit and the scope of the present invention which is defined only by the appended claims.

What is claimed:

1. An image comparing apparatus for comparing a particular inspect image containing an inspect subject with a search image containing a search subject, comprising;
   a search-image supplying unit storing therein a plurality of search images containing different search subjects, some of said search images containing the same search subject captured at different conditions from one another;
   an image acquisition unit acquiring information characterizing said inspect subject appearing in said inspect image, said information relating to a condition of said inspect subject when said inspect image is captured, said information characterizing being determined when the inspect image is captured, said information being associated with said inspect image, and said image acquisition unit selectively extracting at least one search image from said search image supplying unit according to said acquired information; and
   an image specifying unit specifying a particular search image by comparing the inspect image with each of the search-images extracted by said image acquisition unit,
   wherein said search image supplying unit categorizes said plurality of search images into a plurality of image groups having said search images according to the acquired information of said image acquisition unit, and said image acquisition unit selects a particular image group from said search image supplying unit according to said acquired information, and selectively extracts the search image from the particular image group.

2. The image comparing apparatus as claimed in claim 1, wherein said image acquisition unit acquires the information characterizing said inspect subject from appending information appending to the inspect image obtained when the inspect image is captured.

3. The image comparing apparatus as claimed in claim 1, wherein said image acquisition unit acquires an illumination condition of the inspect image as said information characterizing said inspect subject and extracts the search images substantially matching with said illumination condition of said search image from said search image supplying unit.

4. An image comparing apparatus for comparing a particular inspect image with a search image containing a subject shown on the inspect image, comprising;
   a search-image supplying unit storing therein a plurality of search images;
   an image acquisition unit acquiring information characterizing the inspect image, said image acquisition unit selectively extracting at least one search image from said search image supplying unit according to said acquired information; and
   an image specifying unit specifying a particular search image by comparing the inspect image with each of the search-images extracted by said image acquisition unit,
   wherein said image acquisition unit acquires an illumination condition of the subject image as said information characterizing the inspect image and extracts the search images substantially matching with said illumination condition of said search image from said search image supplying unit, and
   wherein said image acquisition unit acquires the illumination direction on the inspect image as said illumination condition, and extracts the search-images substantially matching with said illumination direction from said search image supplying unit.

5. The image comparing apparatus as claimed in claim 1, wherein said image acquisition unit acquires the orientation of the inspect image as said information characterizing said inspect subject, and extracts the search-images substantially matching with the orientation of said search image from said search image supplying unit.

6. The image comparing apparatus as claimed in claim 1, further comprising:
   a color temperature acquisition unit acquiring a color temperature of illumination source illuminating the inspect image; and
   a color adjustment unit adjusting the hue of the search images for substantially matching with said color temperature acquired by said color-temperature acquisition unit.

7. The image comparing apparatus as claimed in claim 1, further comprising:
   a focus state acquisition unit acquiring a focus status of the inspect image; and a focus state adjustment unit adjusting a focus state of the search image extracted from the search image supply unit according to the acquired focus status of the inspect image.

8. The image comparing apparatus as claimed in claim 1, wherein said search image supply unit generates computer simulated search images according to the acquired information and provides said image acquisition unit with the computer simulated search images.

9. A method of comparing a particular inspect image containing an inspect subject with a search image containing a search subject, the method comprising:
    storing a plurality of search images containing different search subjects, some of said search images containing the same search subject captured at different conditions from one another;
    selectively extracting at least one search image according to information characterizing said inspect subject appearing in said inspect image, said information relating to a condition of said inspect subject when said inspect image is captured, said information being associated with said inspect image, said information characterizing said inspect subject is obtained when the inspect image is captured and said information characterizing being determined when the inspect image is captured; and
    specifying a particular search image by comparing the inspect image with said search image,
    wherein said storing categorizes said plurality of search images into a plurality of image groups having said search images according to said information, and said extracting selects a particular image group according to said information, and selectively extracts the search image from the particular image group.

10. A computer readable medium storing thereon a program for comparing a particular inspect image containing an inspect subject with a search image having a search subject, comprising:
    a module for storing a plurality of search images containing different search subjects, some of said search images containing the same search subject captured at different conditions from one another; a module for selectively extracting at least one search image according to information characterizing said inspect subject appearing in said inspect image, said information relating to a condition of said inspect subject when said inspect image is captured, said information being associated with said inspect image, said information characterizing said inspect subject is obtained when the inspect image is captured, and said information characterizing being determined when the inspect image is captured; and
    a module for specifying a particular search image by comparing the inspect image with each of said at least one search image,
    wherein said module for storing categorizes said plurality of search images into a plurality of image groups having said search images according to said information, and said module for selectively extracting selects a particular image group according to said information, and selectively extracts the search image from the particular image group.

11. An image capturing apparatus, comprising:
    an image capture unit photographing a subject and outputting a subject image;
    a fisheye lens provided on a top face of the image capturing apparatus specifying position of an illumination source which illuminates the subject when said image capturing apparatus photographs the subject;
    an illumination direction detection unit detecting an illumination direction of the illumination source to the subject with respect to the image capturing apparatus by means of said fisheye lens;
    a recording unit storing said subject image and said illumination direction associated with said subject image.

12. A method of capturing an image, comprising: photographing a subject;
    outputting a subject image containing the subject;
    detecting illumination direction to the subject with respect to an image capturing apparatus photographing the subject by means of a fisheye lens provided on a top face of the image capturing apparatus when photographed; and
    storing said subject image and said illumination direction associated with said respective subject image.

13. An image selecting apparatus for detecting a particular image, which has an inspect subject appearing in an inspect image appending thereto information characterizing the inspect subject, from a plurality of search images containing different search subjects, comprising;
    a search image data base categorizing the plurality of search images into a plurality of image groups according to a condition of the search image, said condition containing at least an illumination direction to the search subject in the respective search image; and
    an image acquisition unit comprising:
    an image group selector determining a particular image group from the plurality of the image groups according to the information characterizing the inspect subject; and
    a search image extractor selectively identifying the particular search image from the particular image group according to the information characterizing the inspect subject.

14. An image selecting apparatus as claimed in claim 13, further comprising:
    a color temperature acquisition unit acquiring a color temperature of an illumination source illuminating the inspect subject; and
    a color adjustment unit adjusting a hue of the search image, identified by said search image extractor, to substantially match with said color temperature acquired by said color temperature acquisition unit.

15. An image selecting apparatus as claimed in claim 13, further comprising:
    a focus state acquisition unit acquiring a focus status of the inspect image; and
    a focus state adjustment unit adjusting a focus state of the search image, identified by said search image extractor, according to the acquired focus status of the inspect image.

16. An image extracting system for extracting a particular image having an inspect subject appearing in an inspect image appending thereto information characterizing the inspect subject from a plurality of search images containing different search subjects, comprising:
    an image selecting apparatus comprising:
    a search image database arranging the plurality of search images into a plurality of image groups according to a condition of the search image, said condition containing at least an illumination direction to the search subject in the respective search image;

an image acquisition unit selectively identifying the particular search image from the search image data base according the information characterizing the inspect subject; and an image extracting apparatus comparing the search image identified by said image selecting apparatus with the inspect image and extracting the search image containing the inspect subject.

17. An image extracting system as claimed in claim 16, wherein said image acquisition unit comprises:

an image group selector determining a particular image group from the plurality of image groups according to the appending information; and a search image extractor selectively identifying the particular search image from the particular image group according the appending information.

18. An image extracting system as claimed in claim 16, wherein said image selecting apparatus further comprises:

a weather database storing information referring to past weather corresponding to a date;

an illumination direction obtaining unit identifying the illumination direction at a time of photographing the inspect image according to said weather database and said information characterizing the inspect subject comprising at least a date code of the time of photographing the inspect image.

19. An image extracting system as claimed in claim 16, further comprising:

a color temperature acquisition unit acquiring a color temperature of an illumination source illuminating the inspect subject;

a color adjustment unit adjusting a hue of the search image, identified by said search image selecting apparatus, to substantially match with said color temperature acquired by said color temperature acquisition unit; and an image extracting apparatus comparing the search image, a color of which is adjusted by said color adjustment unit, with the inspect image, and extracting the search image containing the inspect subject.

20. An image extracting system as claimed in claim 16, further comprising:

a focus state acquisition unit acquiring a focus status of the inspect image;

a focus state adjustment unit adjusting a focus stale of the search image, identified by said search image selecting apparatus, according to the acquired focus status of the inspect image; and an image extracting apparatus comparing the search image, a focus state of which is adjusted by said focus state adjustment unit, with the inspect image, and extracting the search image containing the inspect subject.

21. The image comparing apparatus as claimed in claim 1, wherein said information is determined based on at least one of an illumination condition, a positional relationship between an image capturing apparatus and the inspect subject, and a capturing condition of the image capturing apparatus.

22. The method of claim 9, wherein said information is determined based on at least one of an illumination condition, a positional relationship between an image capturing apparatus and the inspect subject, and a capturing condition of the image capturing apparatus.

23. The computer readable medium as claimed in claim 10, wherein said information is determined based on at least one of an illumination condition, a positional relationship between an image capturing apparatus and the inspect subject, and a capturing condition of the image capturing apparatus.

* * * * *